United States Patent
Alward

(10) Patent No.: US 8,265,669 B2
(45) Date of Patent: Sep. 11, 2012

(54) METHOD AND SYSTEM FOR PROVIDING BEARER TAG IDENTIFICATION-BASED MESSAGING

(75) Inventor: David M. Alward, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 350 days.

(21) Appl. No.: 12/562,565

(22) Filed: Sep. 18, 2009

(65) Prior Publication Data

US 2011/0070901 A1 Mar. 24, 2011

(51) Int. Cl.
*H04W 4/12* (2009.01)

(52) U.S. Cl. .................. 455/466; 705/14.27; 705/14.52

(58) Field of Classification Search .................. 455/456, 455/466, 414; 705/14
See application file for complete search history.

(56) References Cited

U.S. PATENT DOCUMENTS

| | | |
|---|---|---|
| 2004/0186768 A1* | 9/2004 | Wakim et al. .................. 705/14 |
| 2004/0193488 A1* | 9/2004 | Khoo et al. .................... 705/14 |
| 2005/0123114 A1* | 6/2005 | Trandal et al. ........... 379/201.01 |

* cited by examiner

*Primary Examiner* — Kamran Afshar
*Assistant Examiner* — Kashif Siddiqui

(57) ABSTRACT

An approach is provided for bearer tag identification-based messaging. A request is received specifying a bearer tag identifier corresponding to a mobile terminal. Addressing information is determined for the mobile terminal based on the bearer tag identifier, wherein the addressing information is used for transmitting a message according to a messaging service to the mobile terminal over a wireless network.

16 Claims, 8 Drawing Sheets

METHOD AND SYSTEM FOR PROVIDING BEARER TAG IDENTIFICATION-BASED MESSAGING

BACKGROUND INFORMATION

Modern lifestyles are becoming increasingly more reliant on mobile communications devices, such as cellular telephones, laptop computers, pagers, personal digital assistants (PDAs), and the like. Advances in technology, services, and affordability have further given rise to a host of "additional" communication features beyond that of voice communication, including functions like short message service (SMS), enhanced message service (EMS), multimedia message service (MMS), wireless application protocol (WAP) push, etc., messaging. Businesses, enterprises, governments, institutions, organizations, and the like, are beginning to utilize these "additional" modes of communication as avenues for information dissemination, such as for advertisement purposes. Unfortunately, the content that is transmitted is not targeted to individuals, nor is the act of messaging an automated occurrence.

Therefore, there is a need for an approach that provides enhanced messaging services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing bearer tag identification-based messaging are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to radio frequency identification (RFID)-based messaging, it is contemplated that various exemplary embodiments are also applicable to other equivalent proximity-based identification technologies.

Figure 1:
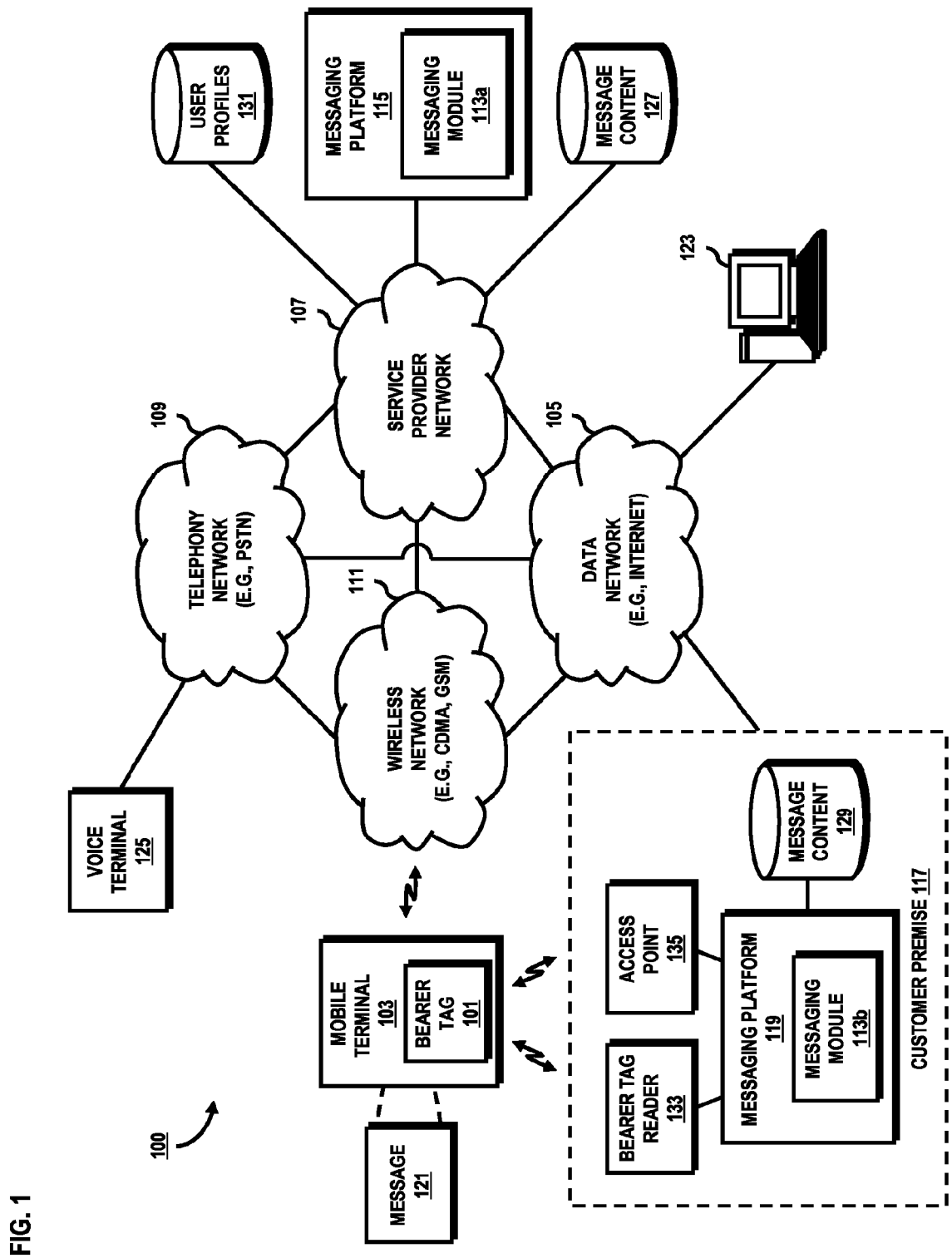
FIG. 1 is a diagram of a system configured to provide bearer tag identification-based messaging, according to an exemplary embodiment.

FIG. 1 is a diagram of a system configured to provide bearer tag identification-based messaging, according to an exemplary embodiment. For the purposes of illustration, system 100 is described with respect to a mechanism for supporting one or more messaging services, such as a short messaging service (SMS), an enhanced messaging service (EMS), a multimedia messaging service (MMS), a wireless application protocol (WAP) push service, etc., that are triggered based on detecting, reading, or otherwise receiving one or more bearer tag identifiers corresponding to one or more bearer tags (e.g., bearer tag 101) associated with one or more mobile terminals (e.g., mobile terminal 103). In exemplary embodiments, the mechanism may be provided over one or more networks (e.g., data network 105, service provider network 107, telephony network 109, and wireless network 111), such as messaging module 113a of messaging platform 115, or may be provided at one or more customer premises (e.g., customer premise 117), such as messaging module 113b of messaging platform 119. In one embodiment, customer premise 117 is that of a third party with respect to the user of the mobile terminal 103, such as a premise location corresponding to a business. Although the system 100 is explained with respect to businesses, it is contemplated that certain exemplary embodiments can be applied to other entities, e.g., enterprise, government, institution, organization, etc. It is noted that messaging platform 115 may be maintained and operated by a service provider, such as a service provider of one or more of the aforementioned messaging services. In this manner, one or more bearer tag identification-based messages (e.g., message 121) may be transmitted to one or more user devices, such as mobile terminal 103, computing device 123, and voice terminal 125, based on receiving a bearer tag identifier associated with a mobile terminal (e.g., mobile terminal 103), determining addressing information associated with respective user devices 103, 123, and 125 based on the bearer tag identifier, and utilizing the addressing information to convey the message(s) to the one or more user devices 103, 123, and 125. While specific reference will be made hereto, it is contemplated that system 100 may embody many forms and include multiple and/or alternative components and facilities.

It is observed that conventional methodology for exchanging messages between two or more parties typically involves a sending party generating a message, specifying one or more desired recipients by, for instance, known addressing information corresponding to one or more user devices of the desired recipients, and transmitting the generated message to the desired recipients via one or more messaging services, such as one or more SMS, EMS, MMS, WAP push, etc., messaging services. It is noted that the addressing information may relate to one or more directory numbers, electronic serial numbers (ESN), international mobile equipment identifiers (IMEI), machine access control (MAC) addresses, mobile directory numbers (MDN), mobile equipment identities (MEI), mobile identification numbers (MIN), internet protocol (IP) addresses, port addresses, messaging aliases, etc. Accordingly, without knowledge of the addressing information corresponding to the intended recipients, sending parities are essentially unable to transmit messages to intended recipients. This often results in, for instance, businesses turning to mass broadcasting or even "spamming" techniques to disseminate their information. Namely, businesses may resort to generating (or otherwise compiling) exhaustive contact lists, as well as generalized messages that are then transmitted to the masses utilizing the contact list information. As can be expected, this often causes individuals to guard their contact (or addressing) information even more closely, which further aggravates the situation. At the other end of the spectrum, certain individuals may benefit from some of the disseminated information; however, because the content is not targeted to these particular individuals, the information may simply be ignored. In certain instances, the individuals may also fear that their contact information may be shared or utilized in other unacceptable manners such that the individuals will often choose to forgo receiving any messages to avoid receiving undesired information. Furthermore, because the content is generally unsolicited, recipients also tend to attach a stigma to the content and, thereby, are even less likely to pay attention.

Therefore, the approach of system 100, according to certain exemplary embodiments, stems from the recognition that supporting one or more messaging services that are triggered based on the detection (or otherwise reception) of bearer tag identifiers associated with mobile terminal users, enables businesses to effectively and efficiently automate the dissemination of message content. Furthermore, given that the detection of bearer tag identifiers is proximity based, users may receive message content at least tailored to their surrounding environment. The approach of system 100 according to certain other exemplary embodiments stems from the recognition that by enabling mobile terminal users to generate, customize, and manage user profile information governing the reception of messages from one or more third-parties further enables these users to effectively and efficiently prevent or, at least, filter the messages they receive. In other instances, this user profile information may be utilized to tailor the messages transmitted to the mobile terminal users. Moreover, business entities may be enabled to generate, customize, and manage user profile information for scheduling or defining circumstances for transmitting messages to mobile terminal users, as well as registering and creating profiles for consenting customers (or patrons) of their premise locations, which may be selectively customized and managed by these customers and/or the businesses. The approach of system 100, according to certain other exemplary embodiments, enables the businesses (via bearer tag readers) to detect, read, or otherwise receive bearer tag identifiers associated with mobile terminals entering their "customer premises," such that the businesses may transmit one or more requests to a managed messaging platform configured to identify one or more user devices, such as a mobile terminal, associated with the bearer tag identifier and, thereby, addressing information associated with the mobile terminal. It is further noted that the messaging platform may utilize the mobile terminal user profile information and/or the content provider user profile information to determine whether or not to transmit a message to identified user devices, as well as determine and generate message content tailored to the user of the user device. As such, the messaging platform may provide a gateway service to users, such that the anonymity of the recipient user devices (e.g., mobile terminals) and, thereby, of the users themselves may be preserved and guarded from third-parties wanting to transmit information to the users. It is noted that in those instances when the business entities register and generate user profiles for their consenting customers, these customers may be provided with certain incentives for relinquishing their identities and/or certain personal information to the business entities. In this manner, the managed messaging services of system 100 permits users to control the messages and message content that they receive, as well as protect their anonymity and/or receive incentives in those instances when their identities are permissibly disclosed. Further, the managed messaging services of system 100 enables content providers to disseminate tailored messages to otherwise receptive individuals.

In exemplary embodiments, system 100 facilitates bearer tag identification-based messaging by enabling mobile terminal users (or subscribers) to access messaging platform 115 via one or more user devices (e.g., mobile terminal 103, computing device 123, and voice terminal 125) to register to the managed messaging services of system 100, as well as to create, customize, and manage one or more user profiles. These user profiles may include one or more user-defined messaging policies enabling subscribers to opt-in or opt-out of receiving messages from third-parties, as well as correlate bearer tag identifiers with addressing information of one or more user devices, such as mobile terminal 103, computing device 123, and voice terminal 125, for receiving bearer tag identification-based messages. The user-defined messaging policies may further include one or more parameters (or criteria) governing the "who," "what," "when," "where," and "how" bearer tag identification-based messages are to be received, such as various parameters defining amount (e.g., certain number of messages per hour, day, week, etc.), frequency of presentation (e.g., continuously, periodically, on-demand, etc.), messaging mode (e.g., SMS, EMS, MMS, WAP push, etc., messaging), marketplaces (e.g., basic materials, capital goods, energy, financial, healthcare, services, technology, transportation, utilities, etc.), and the like. In certain embodiments, the user-defined messaging policies may include other suitable criteria, such as one or more "whitelists" specifying permissible third parties, message content, etc., that may be targeted to the users and one or more "blacklists" specifying impermissible (or objectionable) third parties, message content, etc., that should not be received.

According to various exemplary embodiments, these parameters, criteria, etc., may be utilized by one or more of messaging modules 113a and 113b to select, retrieve, and transmit messages and/or or message content to users associated with mobile terminals 103. As such, users may be enabled to generate users profiles including other information related to the subscribers, such as user profile information defining subscription information (e.g., account numbers, usernames, passwords, security questions, monikers, etc.), subscriber demographics (e.g., age, gender, ethnicity, location of residence, zip code, school district, community, socio-economic status, religion, marital status, ownerships, languages, mobility, life cycles, etc.), location (e.g., spatial positioning, latitude, longitude, elevation, etc.), group/organizational affiliations (e.g., political), memberships, interests, buddies, friends, cohorts, associated users/devices, etc., as well as any other like personal information. As such, any of the described user profile information may be utilized to target message content to subscribers and, as a result, subscribers may also be permitted to define permissible boundaries for the use and/or dissemination of their user profile information, whether in connection with receiving bearer tag identification-based messages or whether associated with some other purpose.

Similarly, customer premise users (e.g., third party content providers, customer premise employers, customer premise employees, etc.), may also have access to messaging platform 115 via one or more user devices, such as mobile terminal 103, computing device 123, and voice terminal 125. As such, customer premise users may register to the managed messaging services of system 100, as well as create, customize, and manage one or more customer premise user profiles including, for example, scheduling information (e.g., dates, times, events, circumstances, etc.) for selecting message content to be transmitted to one or more of user devices 103, 123, and 125 based on the detection, reading, or otherwise reception of a bearer tag identifier corresponding to a mobile terminal within a certain distance (or proximity) of bearer tag reader 133. It is noted that customer premise user profiles may include other suitable user profile information, such as username, password, account information, billing information, configuration information, description, address, hours of operation, product/service offering(s), product/service price (s), helpdesk information, contact addresses, menus, catalogues, and the like. It is further noted that customer premise users may be provided access to messaging platform 115 to store and manage messaging content to message content repository 127. In this manner, a third party can define the times and circumstances that particular messages are selected from among the messages available. Additionally, user preference and profile information can be used to select from among the messages sent to the user/subscriber.

According to particular embodiments, customer premise users (e.g., employers, employees, etc.) may be provided selective access to messaging platform 115 and/or 119 in order to establish customer or patron user profiles for mobile terminal users (or subscribers) that provide their consent. For instance, an employee of a business establishment may proposition a customer to join the managed messaging service of system 100. These user profiles may be stored as one or more sub-profiles of a primary customer premise user profile or may be stored as one or more separate mobile terminal (or subscriber) user profiles. As such, individuals corresponding to these "customer" user profiles may be provided selective access to customize and manage one or more parameters, criteria, etc., of these user profiles, as previously described. It is noted that individuals corresponding to these "customer" user profiles may lose their ability to remain anonymous and, therefore, a business, service provider of system 100, third party, etc., may provide certain incentives (e.g., credits, discounts, exclusive offers, etc.) for these individuals disclosing their identities to the businesses. Further, it is also contemplated that these individuals may be enabled to limit the "sharing" and/or "use" of their user profile information with (or by) the businesses.

According to exemplary embodiments, mobile terminal and customer premise users may access messaging platform 115 via a portal (not illustrated), such as a voice portal or a web portal. In one embodiment, a networked application for implementing the portal may be deployed via messaging platform 115; however, it is contemplated that another facility or component of system 100, such as a frontend, middleware, or backend server, may deploy the application and, consequently, interface with messaging platform 115. In this manner, the portal may include or provide users with the ability to access, configure, manage, and store user profiles to, for example, user profiles repository 131 or any other suitable storage location or memory of (or accessible to) system 100, such as one or more memories (not shown) of user devices 103, 123, and 125, messaging platform 115, messaging platform 119, etc. Likewise, the portal may include or provide customer premise users with the ability to access, configure, manage, and store message content to, for example, message content repository 127 or any other suitable storage location or memory of (or accessible to) system 100, such as one or more memories (not shown) of messaging platform 115, messaging platform 119, etc. As such, the portal enables these users to provide corresponding authentication information to messaging platform 115 via user devices 103, 123, and 125 and, subsequently, create, customize, and manage one or more user profiles and/or message content via one or more user interfaces, e.g., graphical user interfaces (GUI), implemented via the portal and/or user devices 103, 123, and 125. It is also contemplated that these portals may be provided (or accessed) via one or more kiosks, which may be maintained at customer premises 117 or any other suitable location. This provides the various users of system 100 yet another mode of interaction.

As seen in FIG. 1, mobile terminals 103 (according to exemplary embodiments) include bearer tags 101 having bearer tag identifiers respectively associated therewith. Bearer tags 101 may be any suitable contactless card, near field communication (NFC) tag, radio frequency identification (RFID) tag, etc., or any combination thereof. In this manner, bearer tag identifiers may embody, for instance, a code, parameter, value, etc., that distinctly identifies one bearer tag from another. It is contemplated, however, that one or more bearer tags 101 may be assigned equivalent bearer tag identifiers so that one or more users may be distinctly identified by equivalent bearer tag identifiers. It is also contemplated that bearer tags 101 may include other information, such as any of the described user profile information.

According to one embodiment, customer premises 117 may include bearer tag readers 133 for detecting, reading, or otherwise receiving bearer tag identifiers of bearer tags 101 when, for example, bearer tag 101 and, thereby, mobile terminal 103 comes within a certain distance (or proximity) of bearer tag reader 133. Accordingly, it is noted that communication between bearer tags 101 and bearer tag readers 133 occurs wirelessly and, as such, may not require a clear "line of sight" between the respective devices. As such, bearer tag 101 (e.g., an RFID transponder) may be, for instance, a small microchip attached to an antenna (not shown) of mobile terminal 103 or may be otherwise affixed to any other suitable component of (or within) mobile terminal 103.

It is generally noted that bearer tags 101 may be passive or active. Passive bearer tags are generally smaller, lighter, and less expensive than active bearer tags. As such, passive bearer tags may only be activated when within a response range of a suitable bearer tag reader 133. For instance, bearer tag reader 133 may emit a relatively low-power radio wave field that is used to power bearer tag 101 and, thereby, enable bearer tag 101 to transmit suitable information stored to the device to bearer tag reader 133. Active bearer tags, however, may incorporate (or otherwise have access to) a power source that enables active bearer tags to actively transmit information stored to these devices, rather than reflect radio frequency signals, as in the case of passive bearer tags. Accordingly, active bearer tags may afford certain additional features, such as programmable and read/write capabilities. As such, mobile terminal users may be permitted to store, for instance, suitable user profile information to active bearer tags.

According to exemplary embodiments, bearer tag readers 133 contain one or more transmitters, receivers, control units, and/or antennas. As such, bearer tag readers 133 may utilize these components to energize bearer tags 101, as well as demodulate and decode returned radio signals. In certain instances, bearer tag readers 133 may include one or more interfaces for converting received radio signals into one or more forms that may be passed to other systems, such as messaging platform 119. For example, bearer tag readers 133 may be configured to formulate requests for transmitting bearer tag identification-based messages to one or more user devices, such as mobile terminal 103, and to transmit such requests to messaging platform 119 in order to carry out the processes described herein. It is noted that bearer tag readers 133 may also be configured to determine addressing information associated with detected bearer tag identifiers, which is explained in more detail in accordance with FIG. 6.

By way of example, contactless card, NFC, RFID, and the like, technologies are short-range wireless communication technologies that enable the exchange of data between devices over relatively short distances, e.g., the range for NFC is approximately 4 inches. It is noted, however, that RFID technologies may also be configured as a long-range wireless communication technology. In this manner, customer premises (e.g., customer premise 117) may include one or more bearer tag readers 133 positioned to maximize the effect of transmitting bearer tag identification-based messages (e.g., message 121) to users. For instance, bearer tag readers 133 may be strategically positioned near certain products, service offerings, posters, menus, entrances, registers, exits, and the like, so that message content received by, for instance, mobile terminal 103 may be correlated to the surroundings of message receiving users. It is also noted that bearer tag readers 133 may be spaced about customer premise 117 in order to create an effective bearer tag reader 133 range corresponding to a boundary of customer premise 117.

Customer premise 117 may also include one or more access points 135 for transmitting information (e.g., requests, messages, etc.) over one or more of networks 105-111. In this manner, access point 135 may also be utilized to detect, read, or otherwise receive identifiers associated with one or more other wireless technologies (not shown) of mobile terminals 103, such as Bluetooth device identifiers, infrared device identifiers, and the like. Further, it is contemplated that one or more of messaging platform 119, message content repository 129, bearer tag reader 133 and/or access point 135 may be collocated or otherwise combined into a single or alternatively combined entities.

Accordingly, when mobile terminals 103, but more specifically, bearer tags 101 of (or otherwise associated with) mobile terminals 103, come within a certain distance (or proximity) of bearer tag reader 133 associated with customer premises 117, bearer tag reader 133 may receive information, e.g., a bearer tag identifier, identifying bearer tag 101. Bearer tag reader 133 may provide such information to messaging platform 119 associated with customer premise 117 that is, in turn, configured to transmit, via messaging module 113b and/or a communication interface (not shown) of messaging platform 119, one or more requests to messaging platform 115 for one or more bearer tag identification-based messages (such as message 121) to be transmitted to at least one user device, e.g., mobile terminal 103, associated with a received bearer tag identifier. In this manner, the requests may specify (or otherwise include) detected bearer tag identifiers that are utilized to determine addressing information of the at least one user device. The requests may also be configured to include pre-generated messages and/or message content to be included in a dynamically generated bearer tag identification-based message.

Messaging platform 115 via, for instance, messaging module 113a and/or one or more other components, may be configured to determine addressing information correlated to bearer tag identifiers, generate bearer tag identification-based messages, and transmit bearer tag identification-based messages to the at least one user device over one or more of networks 105-111 utilizing the addressing information. For instance, messaging platform 115 may be configured to generate and transmit message 121 to mobile device 103 via wireless network 111. In certain embodiments, messaging platform 119 and, thereby, messaging module 113b may assume one or more of the features or functionalities of messaging platform 115. It is noted that messaging platform 115 is described in more detail with FIG. 2. Exemplary processes when messaging platforms 115 and/or 119 contribute to the determination of addressing information, generation of bearer tag identification-based messages, and transmission of such messages to at least one user device, are described in accordance with FIGS. 4-6. It is generally noted, however, that messaging modules 113a and/or 113b may be configured to retrieve message content and/or user profile information from suitable storage locations and/or memories of (or accessible to system 100), such as message content repositories 127 and 129 and user profiles repository 131. Thus, one or more of message modules 113a and 113b may generate messages based on mobile terminal and/or customer premise user profile information, as well as based on retrieved and/or received message content.

As seen in FIG. 1, service provider network 107 enables user devices 103, 123, and 125 to access the features and functionality of messaging platform 115 via one or more of networks 105, 109, and 111. Networks 105-111 may be any suitable wireline and/or wireless network. For example, telephony network 109 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), long term evolution (LTE), universal mobile telecommunications system (UMTS), etc., as well as any other suitable wireless medium, e.g., microwave access (WiMAX), wireless fidelity (WiFi), satellite, and the like. Meanwhile, data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 105-111 may be completely or partially contained within one another, or may embody one or more of the aforementioned infrastructures. For instance, service provider network 107 may embody circuit-switched and/or packet-switched networks that include facilities to provide for transport of circuit-switched and/or packet-based communications. It is further contemplated that networks 105-111 may include components and facilities to provide for signaling and/or bearer communications between the various components or facilities of system 100. In this manner, networks 105-111 may embody or include portions of a signaling system 7 (SS7) network, or other suitable infrastructure to support control and signaling functions.

Accordingly, the conjunction of networks 105-111 may be adapted to provide bearer tag identification-based messaging, as well as enable mobile terminal users and customer premise users to access messaging platform 115. User devices 103, 123, and 125 may include any customer premise equipment (CPE) capable of sending and/or receiving information over one or more of networks 105-111. For instance, voice terminal 125 may be any suitable plain old telephone service (POTS) device, facsimile machine, etc., whereas mobile terminal 103 may be any cellular phone, radiophone, satellite phone, smart phone, wireless phone, or any other suitable mobile device, such as a personal digital assistant (PDA), pocket personal computer, tablet, customized hardware, etc. Further, computing device 123 may be any suitable computing device, such as a VoIP phone, skinny client control protocol (SCCP) phone, session initiation protocol (SIP) phone, IP phone, personal computer, softphone, workstation, terminal, server, etc. Even though only a limited number of user devices 103, 123, and 125 are illustrated, it is contemplated that system 100 can support a plurality of user devices 103, 123, and 125.

Accordingly, mobile terminal users may receive and, thereby, experience bearer tag identification-based messages via one or more presentation interfaces (e.g., audio, visual, and/or tactile interfaces) of user devices 103, 123, and 125. For example, users may be presented with one or more graphical depictions, multimedia presentations, interactive applications, textual explanations, etc., from one or more third parties when mobile terminal 103 and, thereby, bearer tag 101 comes within a certain distance (or proximity) of bearer tag reader 133 associated with customer premise 117.

According to one embodiment, user devices 103, 123, and 125 may include one or more client programs (not shown) that operate thereon for presenting bearer tag identification-based messages; however, it also is contemplated that these (or other) client programs may be executed via one or more of messaging platforms 115 and 119 and, thereby, made accessible to users via user devices 103, 123, and 125. In one embodiment, these client programs may relate to one or more graphical user interfaces (GUI) configured to control the presentation of bearer tag identification-based messages, such as message 121. Further, the GUIs may be configured to facilitate the acquisitioning, exchanging, managing, sharing, storing, customizing, updating, etc., of user profile information and/or message content stored to, for instance, one or more of message content repository 127, message content repository 129, and/or user profiles repository 131 or any other suitable storage location or memory of (or accessible to) system 100. In various instances, network browser applications may be provided for accessing similar applications made available by, for example, messaging platform 115. An exemplary GUI capable of execution on mobile terminal 103 is more fully described with respect to FIG. 7.

As previously mentioned, user profiles repository 131 stores user profiles associated with mobile terminal users and/or customer premise users, whereas message content repositories 127 and 129 include one or more forms of message content. In this manner, repositories 127 and 131 may be maintained by a service provider of the managed messaging service of system 100 and repository 129 may be maintained by a third-party, such as a business associated with customer premise 117. It is contemplated that the physical implementation of repositories 127-131 may take on many forms, including, for example, portions of existing repositories of a service provider, new repositories of a service provider, third-party repositories, and/or shared-repositories. As such, repositories 127-131 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when repositories 127-131 are provided in distributed fashions, information and content available via repositories 127-131 may be located utilizing any suitable querying technique, such as electronic number matching, distributed universal number discovery (DUNDi), uniform resource identifiers (URI), etc.

Thus, by providing mobile terminals 103 with bearer tags 101 and customer premises 117 with bearer tag readers 133, system 100 facilitates the automation of message generation and transmission, as well as protects the identities of mobile terminals 103. Namely, because third-parties may request messaging platform 115 to generate and transmit one or more bearer tag identification-based messages (e.g., message 121) to one or more user devices associated with a received bearer tag identifier, the third-party need not be made privy to the personal addressing information utilized by messaging platform 115 to transmit the bearer tag identification-based message(s) to user devices 103, 123, and 125. It is noted, however, that some users may allow the third parties to learn of their identity and/or share other user profile information with these third parties, such as in exchange for special offers, reduced prices, complementary services, etc.

Figure 2:
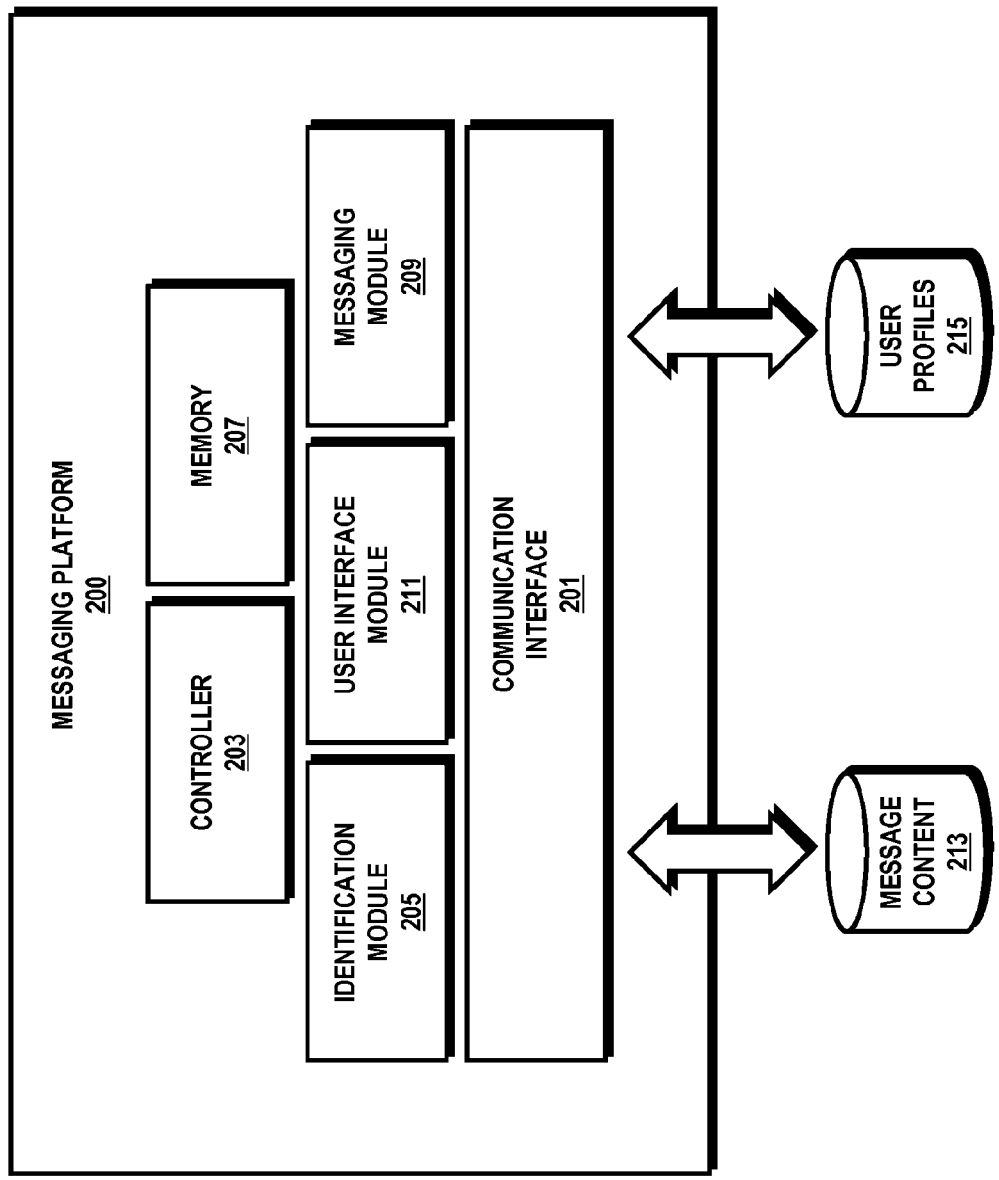
FIG. 2 is a diagram of a messaging platform configured to facilitate bearer tag identification-based messaging, according to an exemplary embodiment.

FIG. 2 is a diagram of a messaging platform configured to facilitate bearer tag identification-based messaging, according to an exemplary embodiment. Messaging platform (or platform) 200 may comprise computing hardware (such as described with respect to FIG. 8), as well as include one or more components configured to execute the processes described herein to facilitate bearer tag identification-based messaging. For descriptive purposes, platform 200 is described as corresponding to messaging platform 115; however, platform 200 may similarly relate to messaging platform 119. According to one implementation, platform 200 includes communication interface 201, controller (or processor) 203, identification module 205, memory 207, messaging module 209, and user interface module 211. Platform 200 may also communicate with one or more repositories, such as message content repository 213 and user profiles repository 215. Further, users (e.g., mobile device users, customer premise users, etc.) may access platform 200 via user devices 103, 123, and 125. It is also contemplated that platform 200 may embody many forms and include multiple and/or alternative components. For example, it is contemplated that the components of platform 200 may be combined, located in separate structures, or separate locations. Namely, a specific topology is not critical to embodiments of platform 200 or system 100.

According to one embodiment, platform 200 embodies one or more application servers accessible to user devices 103, 123, and 125 over one or more of networks 105-111, so that users (or subscribers) may access platform 200 to register to and receive authentication information for the managed messaging service of system 100, as well as to create, customize, and manage one or more user profiles. For example, mobile terminal users may be enabled to create, customize, and manage one or more mobile terminal user profiles enabling the mobile terminal users to opt-in or opt-out of receiving bearer tag identification-based messages from one or more third parties, such as one or more third parties associated with customer premise 117, when bearer tag identifiers respectively corresponding to the mobile terminal users are detected, read, or otherwise received by the third parties. Similarly, customer premise users may be enabled to create, customize, and manage one or more customer premise user profiles enabling the customer premise users to define dates, times, circumstances, etc., for dynamically selecting, retrieving, generating, and transmitting bearer tag identification-based messages (e.g., message 121) to mobile terminal users when, for example, a bearer tag (e.g., bearer tag 101) and, thereby, a mobile terminal (e.g., mobile terminal 103) comes within a certain distance or proximity (e.g., enters customer premise 117) of a bearer tag reader (e.g., bearer tag reader 133) associated with the customer premise user, such that the bearer tag reader may detect, read, or otherwise receive a bearer tag identifier associated with the bearer tag of the mobile terminal. Further, customer premise users (e.g., employers, employees, etc.) may be enabled to register and create user profiles for consenting customers of their customer premises. In turn, these customers may be given selective access to customize and manage the corresponding user profiles, as well as define or limit the amount of their user profile information that is "shared" with the businesses or capable of being utilized by one or more businesses.

Thus, bearer tag identification-based messages may be dynamically triggered for generation and transmission based on detecting bearer tag identifiers and one or more of the aforementioned types of user profile information. As such, platform 200 provides a user interface, e.g., a voice portal, web portal, etc., or an otherwise networked application, to permit mobile terminal and customer premise users (or subscribers) access to the features and functionalities of platform 200 via one or more of user devices 103, 123, and 125. According to certain embodiments, user interface module 211 may be configured to exchange information between user devices 103, 123, and 125 and a web browser or other networked application or system, such as a voice browser or interactive voice recognition system. In exemplary embodiments, user interface module 211 executes one or more graphical user interface (GUI) applications configured to provide these users with one or more menus of options for creating, customizing, and managing user profiles, as well as engaging with other features of the managed messaging service of system 100. For instance, user interface module 211 may enable mobile terminal users and/or customer premise users to access, modify, query, etc., user profiles repository 213. In other instances, user interface module 211 may be configured to allow customer premise users to upload to, download from, and manage message content stored to message content repository 215.

According to exemplary embodiments, communication interface 201 is configured to receive requests specifying bearer tag identifiers corresponding to bearer tags (e.g., bearer tag 101) and, thereby, corresponding to mobile terminals (e.g., mobile terminal 103). In this manner, communication interface 201 is further configured to port the received requests to identification module 205 and/or messaging module 209. Utilizing a specified bearer tag identifier, identification module 205 is configured to identify one or more user devices, such as mobile terminal 103, correlated with the specified bearer tag identifier. For instance, identification module 205, via communication interface 201, may retrieve user profile information associated with a particular bearer tag identifier from, for example, user profiles repository 131 or any other suitable storage location or memory of (or accessible to) messaging platform 200. In other words, identification module 205 may query user profile repository 131 for mobile terminal user profile information associated with the bearer tag identifier, such that identification module 205 may receive, for instance, at least addressing information (e.g., directory number, electronic serial number, international mobile equipment identifier, machine access control address, mobile directory number, mobile equipment identity, mobile identification number, internet protocol address, port address, etc.) of at least one user device (e.g., mobile terminal 103) that is correlated with the specified bearer tag identifier. In certain exemplary embodiments, identification module 205 may be further configured to retrieve and receive mobile terminal user profile information including one or more user-defined messaging policies governing the "who," "what," "when,"
"where," and "how" messages are to be received from one or more third-parties, such as one or more third-parties associated with customer premise 117. At their core, the one or more user-defined messaging policies enable identification module 205 to determine whether bearer tag identification-based messages may be transmitted to at least one user device (e.g., mobile terminal 103) correlated with the specified bearer tag identifier. It is noted that an exemplary process for identifying and determining one or more user devices correlated to a bearer tag identifier for receiving bearer tag identification-based messages is explained in association with FIG. 4. Accordingly, identification module 205 enables messaging platform 200 to provide a gateway service to mobile terminal users, wherein the anonymity of mobile terminals (e.g., mobile terminal 103) and, thereby, users of these mobile terminals, may be preserved and guarded from third-parties who may otherwise detect, read, or receive a bearer tag identifier associated with the mobile terminals and desire to transmit one or more bearer tag identification-based messages, e.g., message 121, to the mobile terminal users.

Identification module 205 may request messaging module 209 to generate and/or transmit one or more messages to one or more identified user devices, such as mobile terminal 103. In this manner, identification module 205 and/or communication interface 201 may provide messaging module 209 with the request, one or more identities of user devices (e.g., mobile terminal 103, computing device 123, and voice terminal 125) to receive bearer tag identification-based messages associated with, customer premise 117, and/or mobile terminal user profile information. Furthermore, messaging module 209 may be configured to retrieve and receive customer premise user profile information (e.g., scheduling information) from, for instance, user profiles repository 131 based on an origin (e.g., customer premise 117) of the request, as well as parse the request for message content. Utilizing retrieved scheduling information, messaging module 209 may also retrieve message content from message content repository 213 or any other suitable storage location or memory of (or accessible to) platform 200, such as memory 207, message content repository 129, a memory (not shown) of messaging platform 119, etc. As such, messaging module 209 may be configured to generate one or more bearer tag identification-based messages (e.g., message 121) utilizing one or more of the addressing information, mobile user profile information, customer premise user profile information, received message content, and/or retrieved message content. An exemplary process for generating a bearer tag identification-based message is explained in more detail with respect to FIG. 5. It is also contemplated that a request received by communication interface 201 from customer premise 117 may include a bearer tag identification message that is merely to be conveyed to one or more user devices associated with the bearer tag identifier that is also specified (or otherwise included) in the request. In any event, messaging module 209 via communication interface 201 is also configured to transmit a generated or received bearer tag identification-based message to identified user devices (e.g., mobile terminal 103) over one or more of networks 105-111.

In order to provide selective access to the features and functionality of platform 200, messaging platform 200 may also include an authentication module (not illustrated) for authenticating (or authorizing) mobile terminal and customer premise users to platform 200. It is contemplated that the authentication module may operate in concert with communication interface 201 and/or user interface module 211. That is, the authentication module may verify user provided credential information acquired via communication interface 201 and/or user interface module 211 against corresponding credential information stored within a user profile of, for instance, user profiles repository 215. By way of example, the credential information may include "log on" information corresponding to a user name, password, coded key, or other unique identification parameter, such a personal identification number (PIN). In other embodiments, the credential information may include any one, or combination of, a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, biometric code, voice print, etc. Users may provide this information via user devices 103, 123, and 125, such as by spoken utterances, dual-tone multi-frequency signals (DTMF), packetized transmission, etc. Unobtrusive security may be provided by positively identifying and screening users based on one or more of the aforementioned credentials which may be seamlessly provided when user devices 103, 123, and 125 communicate with platform 200, such as a unique ESN, IMEI, MAC address, MDN, MEI, MIN, IP address, port address, messaging alias, etc. Other unobtrusive measures can be made available via specific voice prints, etc.

Additionally, platform 200 may include one or more controllers (or processors) 203 for effectuating the aforementioned features and functionality, as well as one or more memories 207 for permanent or temporary storage of one or more of the aforementioned variables, parameters, criteria, information, etc.

Figure 3B:
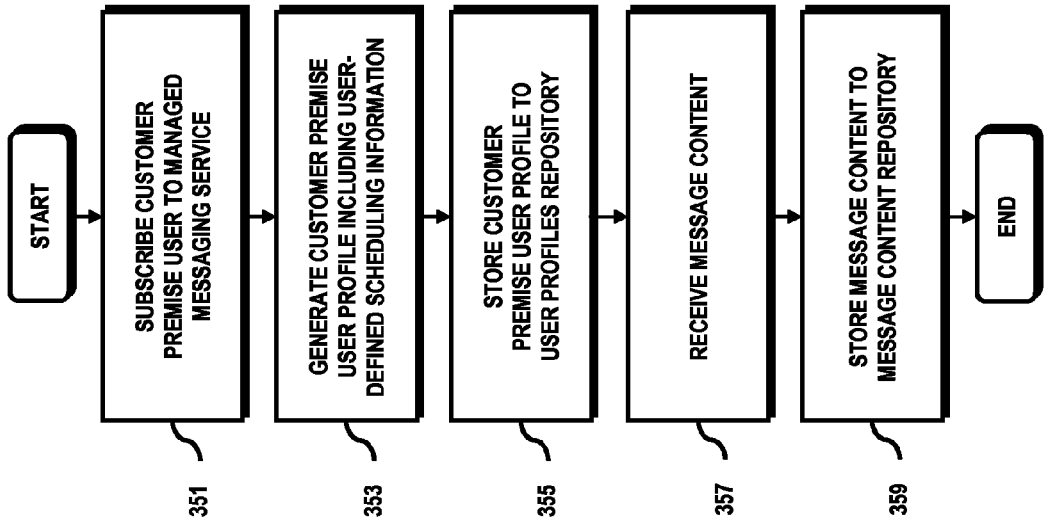
FIGS. 3A and 3B are flowcharts of processes for subscribing users to a managed messaging service, according to exemplary embodiments.
Figure 3A:
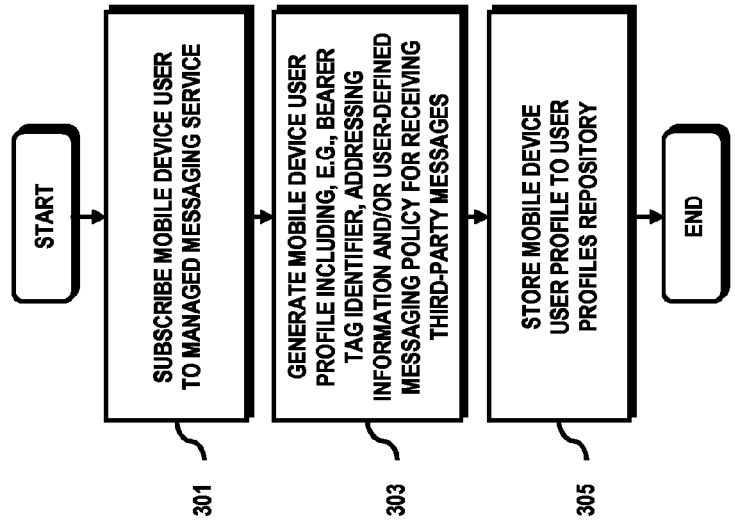

FIGS. 3A and 3B are flowcharts of processes for subscribing users to a managed messaging service, according to exemplary embodiments. In particular, FIG. 3A is an exemplary process for subscribing a mobile terminal user to the managed messaging service, whereas FIG. 3B is an exemplary process for subscribing a customer premise user to the managed messaging service. For illustrative purposes, the processes are described with reference to FIGS. 1 and 2. It is noted that the steps of the processes may be performed in any suitable order, as well as combined or separated in any suitable manner.

At step 301, messaging platform 200 subscribes a user associated with a mobile terminal, e.g., mobile terminal 103, to the managed messaging service of system 100. According to one embodiment, the user may subscribe utilizing any suitable user device capable of processing and transmitting information over one or more of networks 105-111, such as mobile terminal 103, computing device 123, or voice terminal 125. Namely, the user may interact with an input interface (e.g., a keyboard, interactive voice response (IVR) interface, etc.) of, for example, mobile terminal 103 to activate software resident on the device, such as a GUI or other networked application that interfaces with (or is implemented by) platform 200. Alternatively, the user may interact with a voice portal (not shown) interfacing with (or implemented by) platform 200, wherein speech synthesis and voice recognition techniques are utilized to prompt the user for various information and to reduce spoken utterances of the user and/or other signals (e.g., dual tone multi-frequency signals) associated with the user to one or more corresponding inputs. In other instances, the user may relate to a customer premise user creating a user profile for a consenting customer. As such, the user registers as a new subscriber (or for a new subscriber) of the managed messaging service and may obtain sufficient authentication information for establishing future sessions with platform 200. In certain embodiments, registration procedures may prompt the user to identify all user devices (e.g., user devices 103, 123, and 125) that the user may employ to interact with system 100. In this manner, registered devices may be logically associated with the user. It is also contemplated that in those instances when a customer premise user is registering a customer to the managed messaging service of system 100, the customer may be provided with temporary authentication information so that the customer can be partly registered and then later input (or otherwise supply) this or other information in a less "open" environment, such as in the privacy of their own home. As will become more apparent below, this partial registration process may also enable the customer to prevent the business from becoming privy to their mobile terminal identity and/or other personal information; however, as noted above, the business may provide certain incentives to the customer in exchange for this information.

Once registered (or as part of the registration process), messaging platform 200 enables the user, per step 303, to generate a user profile including, for example, a bearer tag identifier of bearer tag 101 and, thereby, of mobile terminal 103. In this manner, the user may also be permitted to correlate the bearer tag identifier 101 with one or more user devices, such as mobile terminal 103, computing device 123, and/or voice terminal 125. Namely, the user may specify addressing information (e.g., directory number, electronic serial number, international mobile equipment identifier, machine access control address, mobile directory number, mobile equipment identity, mobile identification number, internet protocol address, port address, and/or any other suitable address) corresponding to one or more user devices 103, 123, and 125 for accepting messages (such as message 121) from one or more third-parties, e.g., one or more third-parties associated with customer premise 117. The user may be further allowed to create, customize, and manage one or more user-defined messaging policies for extending the managed messaging service to the user. In this manner, the user profile may include the earlier described user profile information, e.g., username, password, account information, billing information, configuration information, and the like, as well as user-defined messaging policy parameters enabling users to opt-in or opt-out of receiving bearer tag identification-based messages from one or more third parties. Accordingly, these parameters (or criteria) may be specified to govern the who, what, when, where, and how messages are to be received, such as the one or more of the aforementioned parameters defining amount, circumstances, frequency, location, mode, subjects, timing, whitelists, blacklists, etc., for receiving bearer tag identification-based messages. As such, platform 200 enables the user to define a mobile user profile that may be utilized to dynamically select, retrieve, and transmit bearer tag identification-based messages (e.g., message 121) to subscribers when, for example, bearer tag 101 and, thereby, mobile terminal 103 comes within a certain distance (or proximity) of a bearer tag reader, e.g., when bearer tag 101 enters customer premise 117 including bearer tag reader 133 and bearer tag reader 133 detects, reads, or otherwise receives a bearer tag identifier associated with bearer tag 101.

At step 305, platform 200 stores the mobile user profile to a list of subscribers to the managed messaging service of system 100, as well as a list of subscriber device addressing information correlated to one or more bearer tag identifiers, authentication information, and user profile information to user profiles repository 131. It is noted that platform 200 may additionally (or alternatively) store or synchronize this information to a storage location or memory of, for instance, messaging platform 200, messaging platform 119, one or more memories of user devices 103, 123, and 125, and/or any other suitable storage location or memory of (or accessible to) system 100. For instance, user profiles generated by customer premise users for consenting customers may be stored as one or more sub-profiles of a primary customer premise user profile and/or may be stored as one or more separate mobile terminal (or subscriber) user profiles, which may be synchronized. Further, it is contemplated that users may directly interact with one or more of these storage facilities, such as user profiles repository 131.

Messaging platform 200 may also be configured to subscribe one or more customer premise users to the managed messaging service of system 100. Referring to FIG. 3B, platform 200 subscribes a customer premise user associated with a customer premise, e.g., customer premise 117, to the managed messaging service of system 100, per step 351. According to various embodiments, the customer premise user may subscribe utilizing any suitable user device capable of processing and transmitting information over one or more of networks 105-111, such as mobile terminal 103, computing device 123, or voice terminal 125. For instance, the customer premise user may interact with an input interface (e.g., a keyboard, interactive voice response (IVR) interface, etc.) of, for example, computing device 123 to activate software resident on the device, such as a GUI or other networked application that interfaces with (or is implemented by) platform 200. As such, the customer premise user registers as a new subscriber of the managed messaging service and may obtain sufficient authentication information for establishing future sessions with platform 200.

Once registered (or as part of the registration process), messaging platform 200 enables the customer premise user, at step 353, to generate a customer premise user profile including, for example, scheduling information governing the generation and transmission of bearer tag identification-based messages to one or more user devices (e.g., mobile terminal 103, computing device 123, and voice terminal 125) associated with a detected, read, or otherwise received bearer tag identifier. For example, the customer premise user may specify date, time, circumstances, etc., that certain messages or message content is to be transmitted to one or more user devices, such as, for example, mobile terminal 103. It is also noted that the customer premise user profile may include the earlier described customer premise user profile information, e.g., username, password, account information, billing information, configuration information, description, address, hours of operation, product/service offering(s), product/service price(s), and the like. As such, platform 200 enables customer premise users to define customer premise user profiles that may be utilized to dynamically select, retrieve, generate, and transmit bearer tag identification-based messages (e.g., message 121) to subscribers when, for example, bearer tag 101 and, thereby, mobile terminal 103 comes within a certain distance (or proximity) of a bearer tag reader associated with the customer premise users, e.g., bearer tag 101 enters customer premise 117 including bearer tag reader 133. At step 355, platform 200 stores the customer premise user profile to a list of subscribed customer premise users of the managed messaging service of system 100 to, for example, user profiles repository 131. It is noted that platform 200 may additionally (or alternatively) store or synchronize this information to any other suitable storage location or memory of (or accessible to) platform 200. Further, it is contemplated that the customer premise users may directly interact with one or more of these storage facilities, such as user profiles repository 131; however, it is noted that these customer premise users may have varying degrees of access (e.g., full, limited, or none) to the mobile user profile information stored to user profiles repository 131.

In step 357, platform 200 may receive message content from the customer premise user for use in generating bearer tag identification-based messages. That is, platform 200 enables customer premise users to upload and manage message content that, in exemplary embodiments, is selected from by messaging module 209 based on the scheduling information and/or mobile user profile information, which further enables bearer tag identification-based messages to be targeted to mobile terminal users. Accordingly, platform 200 stores the received message content to message content repository 127 or any other suitable storage location or memory of (or accessible to) platform 200. As such, platform 200 enables customer premise users to define customer premise user profiles that may be utilized to dynamically select, retrieve, and transmit bearer tag identification-based messages (e.g., message 121) to subscribers when, for example, bearer tag 101 and, thereby, mobile terminal 103 comes within a certain distance (or proximity) of a bearer tag reader associated with the customer premise user, e.g., when bearer tag 101 enters customer premise 117 including bearer tag reader 133 and bearer tag reader 133 detects, reads, or otherwise receives a bearer tag identifier associated with bearer tag 101.

Figure 4:
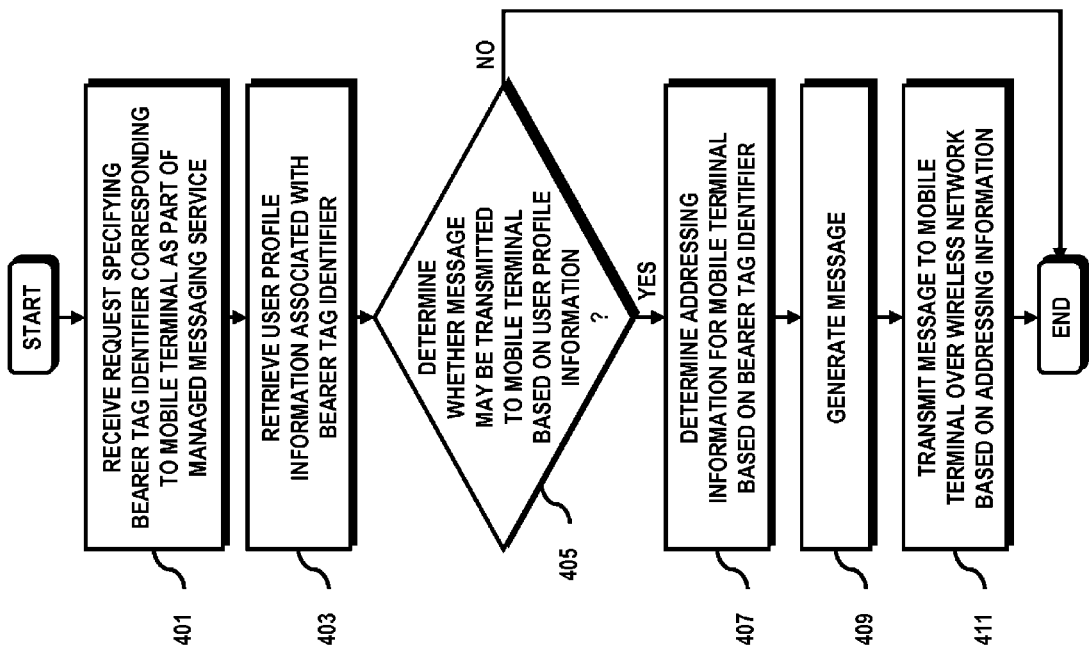
FIG. 4 is a flowchart of a process for transmitting bearer tag identification-based messages to a mobile terminal, according to an exemplary embodiment.

FIG. 4 is a flowchart of a process for transmitting bearer tag identification-based messages to a mobile terminal, according to an exemplary embodiment. For illustrative purposes, the process is described with reference to FIGS. 1 and 2. It is noted that the steps of the process may be performed in any suitable order, as well as combined or separated in any suitable manner. It is also noted that the process involves mobile terminal 103, coupled (or otherwise associated) with bearer tag 101, entering a range (or proximity) of bearer tag reader 133 associated with customer premise 117, such that bearer tag reader 133 is able to read (or otherwise detect) information, e.g., a bearer tag identifier, identifying bearer tag 101 and, thereby, mobile terminal 103. As previously mentioned, bearer tag reader 133 may provide such information to messaging platform 119 associated with customer premise 117 that is, in turn, configured to transmit one or more requests to messaging platform 115 for one or more messages (such as message 121) to be transmitted to at least one user device, e.g., mobile terminal 103, associated with the information.

Thus, at step 401, messaging platform 115 receives, via communication interface 201, a request specifying (or otherwise including) a bearer tag identifier corresponding to bearer tag 101 of mobile terminal 103 as part of a managed messaging service. The request or, at least, the bearer tag identifier may be ported to identification module 205 for identifying mobile terminal 103 and, thereby, one or more users associated with mobile terminal 103. In this manner, identification module 205, via communication interface 201, retrieves (in step 403) user profile information associated with the bearer tag identifier from, for example, user profiles repository 131. It is noted, however, that user profile information may be retrieved from any suitable storage location or memory of (or accessible to) messaging platform 115, such as memory 207, a memory (not shown) of one or more user devices (e.g., mobile terminal 103, computing device 123, and voice terminal 125), etc. That is, identification module 205 may query, in exemplary embodiments, user profile repository 131 for user profile information associated with the bearer tag identifier, such that identification module 205 may receive user profile information including, for instance, addressing information of, at least, mobile terminal 103 associated with the bearer tag identifier and, in certain embodiments, one or more user-defined messaging policies governing the "who," "what," "when," "where," and "how" messages are to be received from one or more third-parties, such as one or more third-parties associated with customer premise 117. Additionally (or alternatively), identification module 205 may receive addressing information corresponding to one or more other user devices, such as computing device 123 and voice terminal 125, that are correlated with the bearer tag identifier. Accordingly, the one or more user-defined messaging policies may further govern the transmission of one or more messages to these one or more other user devices. For the sake of simplicity, however, it is assumed that identification module 205 receives addressing information of mobile terminal 103 and a user-defined messaging policy governing the transmission of messages to mobile terminal 103.

Accordingly, in step 405, identification module 205 determines whether one or messages may be transmitted to mobile terminal 103 based on the retrieved (or received) user profile information, e.g., the user-defined messaging policy. In exemplary embodiments, identification module 205 may parse the user-defined messaging policy to determine if messages from the one or more third-parties associated with customer premise 117 may be transmitted to mobile terminal 103. If messages are not to be transmitted to mobile terminal 103, the process ends. If, however, identification module 205 determines that messages from the one or more third-parties associated with customer premise 117 may be transmitted to mobile terminal 103, then identification module 205, per step 407, determines addressing information for mobile terminal 103 based on the bearer tag identifier. That is, identification module 205 identifies addressing information of mobile terminal 103 within the received user profile information that is correlated with the bearer tag identifier. As such, the addressing information of mobile terminal 103 and, in certain embodiments, the user-defined messaging policy may be provided to messaging module 209 for generating, at step 409, one or more messages (e.g., message 121) for transmission to, for example, mobile terminal 103. An exemplary process for generating messages is described in more detail in accordance with FIG. 5. Nevertheless, in step 411, the one or more generated messages may be transmitted, via communication interface 201, to mobile terminal 103 over one or more of networks 105-111.

Figure 5:
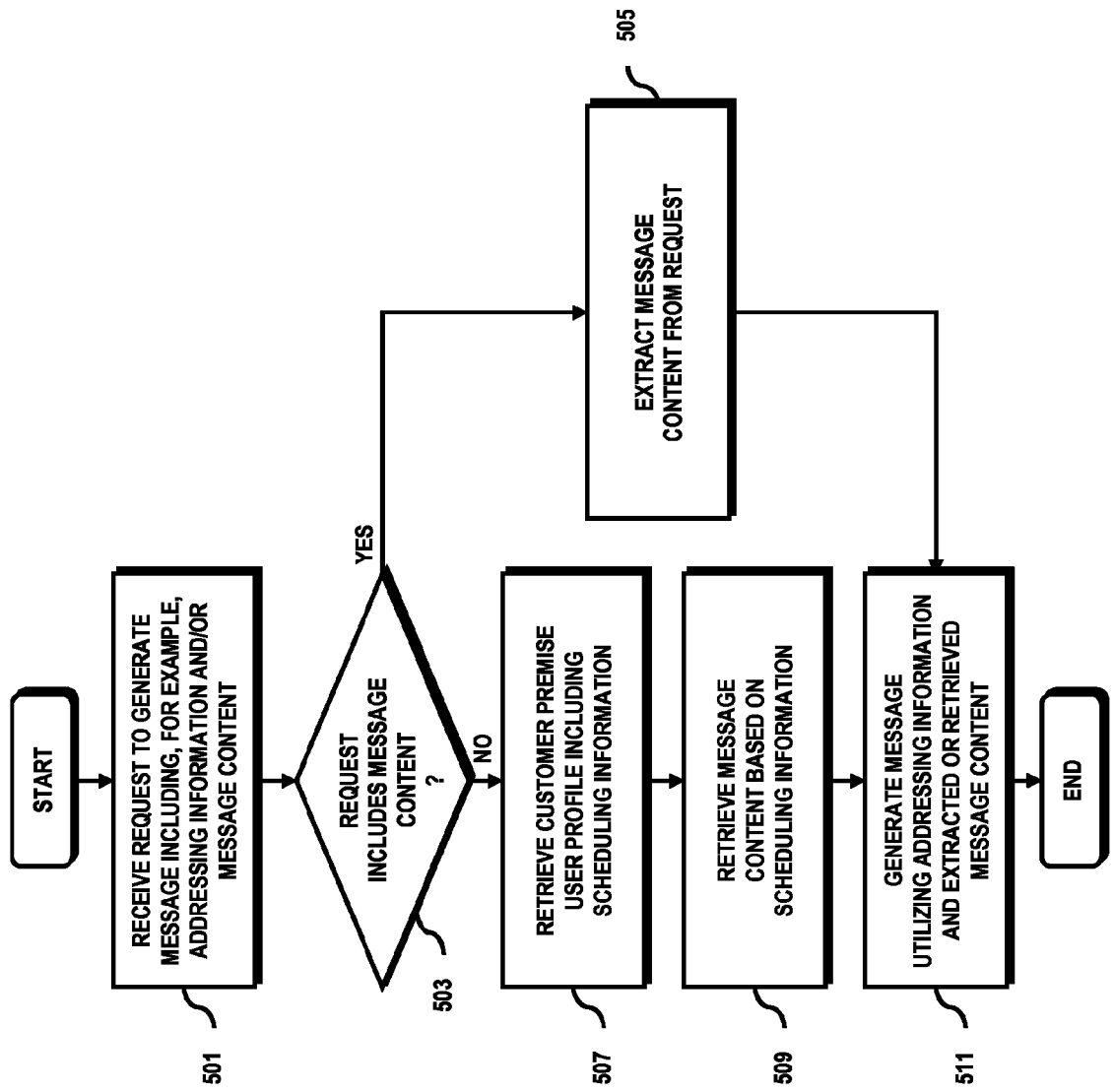
FIG. 5 is a flowchart of a process for generating bearer tag identification-based messages, according to an exemplary embodiment.

FIG. 5 is a flowchart of a process for generating bearer tag identification-based messages, according to an exemplary embodiment. For illustrative purposes, the process is described with respect to messaging platform 200 of FIG. 2; however, it is contemplated that the process may be implemented by messaging platform 200 and/or messaging platform 119. It is also noted that the steps of the process may be performed in any suitable order, as well as combined or separated in any suitable manner. At step 501, messaging module 209 receives a request (or command) to generate a message for transmission to one or more user devices, such as mobile terminal 103. In this manner, the request may include addressing information for mobile terminal 103 and/or message content from messaging module 113b. Thus, in step 503, messaging module 209 determines whether the request to generate a message includes message content. For example, messaging module 209 may parse a payload portion of the request according to information provided in a header portion of the request that specifies a format for the payload portion. Messaging module 209 may determine if a particular field of the payload portion includes message content. If the request includes message content, then messaging module 209 may extract the message content from the request, per step 505. If the request does not include message content, then messaging module 209 via communication interface 201 may retrieve, at step 507, a customer premise user profile from, for example, user profiles repository 131. It is noted, however, that messaging module 209 may retrieve the customer premise user profile from any suitable storage location or memory of (or accessible to) messaging module 209 that may include such information, such as memory 207, a memory of messaging platform 119, etc. As such, the customer premise user profile may include scheduling information (e.g., date, time, circumstances, etc.) for retrieving message content to be utilized in the generation of the requested message. In step 509, messaging module 209 may retrieve, via communication interface 201, message content from, for example, message content repository 127 or any other suitable storage location or memory of (or accessible to) messaging module 209 that may include such content, such memory 207, a memory (not shown) of messaging platform 119, message content repository 129, etc., based on the scheduling information. Thus, per step 511, messaging module 209 generates a message (e.g., SMS, EMS, MMS, WAP push, etc., message) utilizing the addressing information and either the extracted or retrieved message content based on the request. It is also contemplated that messaging module 209 may be configured to generate messages utilizing both extracted and retrieved message content. In such instances, messaging module 209 may retrieve customer premise user profile information before or after step 505 to determine whether additional message content is to be retrieved and utilized in step 511.

According to certain exemplary embodiments, messaging platform 119 may be provided access to user profiles repository 131 and/or may generate messages to be transmitted to one or more user devices, such as mobile terminal 103. As such, messaging platform 119 may also include an identification module (not shown), as well as one or more other components or facilities to implement the processes described herein.

Figure 6:
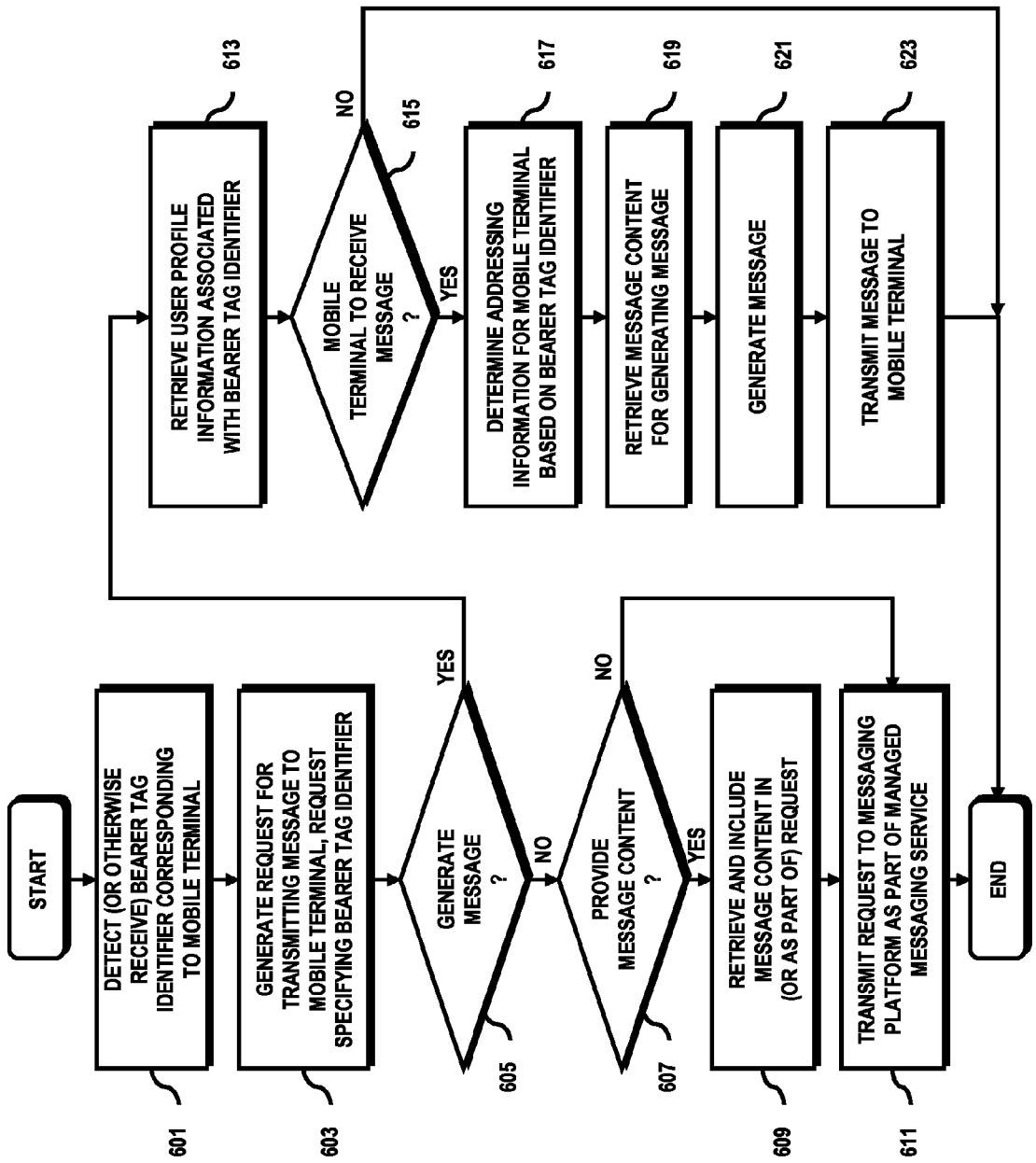
FIG. 6 is a flowchart of a process for transmitting bearer tag identification-based messages to a mobile terminal, according to an exemplary embodiment.

FIG. 6 is a flowchart of a process for transmitting bearer tag identification-based messages to a mobile terminal, according to an exemplary embodiment. For illustrative purposes, the process is described with respect to messaging platform 119 of FIG. 1. It is also noted that the steps of the process may be performed in any suitable order, as well as combined or separated in any suitable manner. Again, it is assumed that mobile terminal 103, with bearer tag 101, is within a certain distance (or proximity) of bearer tag reader 133 associated with customer premise 117. Accordingly, at step 601, bearer tag reader 133 detects, reads, or otherwise receives information, e.g., a bearer tag identifier, identifying bearer tag 101 and, thereby, mobile terminal 103. It is contemplated that other information, e.g., user profile information, etc., may be read from bearer tag 101 by bearer tag reader 133. As such, bearer tag reader 133 may, in step 603, generate a request for transmitting a message to mobile terminal 103, wherein the request specifies (or otherwise includes) the detected bearer tag identifier (and, in certain embodiments, the other information) corresponding to mobile terminal 103 and, thereby, associated with bearer tag 101 and/or one or more users of mobile terminal 103.

In exemplary embodiments, the request is provided to messaging module 113b so that messaging module 113b may determine, per step 605, whether to generate and transmit a message to mobile terminal 103 in response to the request, or whether to request messaging platform 115 to generate and transmit a message to mobile terminal 103. That is, messaging mobile 113b determines whether it has access to sufficient user profile information, e.g., user-defined messaging policy and/or mobile directory number, associated with the detected bearer tag identifier. If messaging module 113b determines it does not have access to sufficient user profile information associated with the detected bearer tag identifier and, thereby, determines to request messaging platform 115 to generate and transmit a message to terminal 103, then, per step 607, messaging module 113b determines whether to provide (or otherwise include) message content in (or as part of) a request to be transmitted to messaging platform 115. The message content is intended to be included in a message to be transmitted to mobile terminal 103 or otherwise utilized by messaging platform 115 to generate a message. If messaging module 113b determines that message content is to be provided in the request for transmission to messaging platform 115, then messaging module 113b, at step 609, retrieves message content for the message to be transmitted to mobile terminal 103. According to exemplary embodiments, the message content may be retrieved from, for example, message content repository 129; however, it is contemplated that messaging module 113b may retrieve the message content from any suitable storage location or memory of (or accessible to) messaging module 113b, such as message content repository 127, a memory (not shown) of messaging platform 119, a memory (not illustrated) of messaging platform 115, etc. It is also contemplated that the message content may be retrieved based on scheduling information (e.g., date, time, circumstances, etc.) specified by, for instance, an administrator of customer premise 117. The scheduling information may be programmed to messaging module 113b or may be made available to messaging module 113b via, for instance, a memory of messaging platform 119, user profiles repository 131, etc. In any event, messaging module 113b may include the message content in the aforementioned request, such as by including (or appending) the request with the message content. For instance, the request may include a header portion and a payload portion, such that the message content may be added to a particular field of the payload portion and information may be added to a predetermined field of the header portion describing and/or specifying the location of the message content in the payload portion. It is noted that the request may further specify or include the bearer tag identifier in a field of the payload portion or header portion. Thus, at step 611, messaging module, via a communication interface (not shown) of messaging platform 119, transmits the request to messaging platform 115 as part of a managed messaging service. In this manner, messaging platform 115 may serve as a gateway to mobile terminal 103 and, thereby, guard the anonymity of addressing information, e.g., a mobile directory number, etc., of mobile terminal 103. In this manner, the identity of a user (or other sensitive information corresponding to the user) associated with mobile terminal 103 can be preserved.

If, however, messaging module 113b determines, in step 605, that it does have access to sufficient user profile information associated with the detected bearer tag identifier and, thereby, determines that it may generate a message for transmission to mobile terminal 103 over one or more of networks 105-111, then messaging module 113b, via a communication interface (not shown) of messaging platform 119, may retrieve (per step 613) user profile information, such as a user-defined messaging policy and/or addressing information (e.g., a mobile directory number, etc.) from, for example, user profiles repository 131, that is associated with the detected bearer tag identifier and, thereby associated with mobile terminal 103. It is noted, however, that the user profile information may be retrieved from any suitable storage location or memory of (or accessible to) messaging module 113b, such as a memory (not shown) of messaging platform 115 or 119, a memory (not illustrated) of one or more user devices (e.g., mobile terminal 103, computing device 123, and voice terminal 125), etc. Namely, messaging module 113b, via the aforementioned communication interface of messaging platform 119, may query, in exemplary embodiments, user profile repository 131 for user profile information associated with the detected bearer tag identifier. In response, messaging module 113b may receive the user profile information including, for instance, the at least one user-defined messaging policy governing the "who," "what," "when," "where," and "how" messages are to be received from one or more third-parties, such as a third-party associated with customer premise 117, and/or the addressing information. As previously mentioned in connection with FIG. 4, the at least one user-defined messaging policy may further govern the transmission of messages to other user devices, such as computing device 123 and voice terminal 125, but for the sake of simplicity, it is assumed that the retrieved messaging policy governs transmission of messages to mobile terminal 103.

Accordingly, in step 615, messaging module 113b determines whether one or messages may be transmitted to mobile terminal 103 based on the retrieved user profile information, e.g., the user-defined messaging policy. That is, messaging module 113b parses, in exemplary embodiments, the user-defined messaging policy to determine if one or more messages may be transmitted to mobile terminal 103 from customer premises 117. If messages are not to be transmitted to mobile terminal 103, the process ends. However, if at least one message may be transmitted to mobile terminal 103, then messaging module 113b determines (per step 617) addressing information for mobile terminal 103 based on the detected bearer tag identifier. For instance, messaging module 113b may identify a mobile directory number within the retrieved user profile information that is correlated to the bearer tag identifier. At step 619, messaging module 113b retrieves message content for generating a message to be transmitted to mobile terminal 103 from, for example, message content repository 129 or any other suitable storage location or memory of (or accessible to) messaging module 113b. As previously mentioned with respect to step 609, the message content may be retrieved based on scheduling information specified by an administrator of customer premise 117. In step 621, messaging module generates a message including (or otherwise utilizing) the retrieved message content for transmission to the determined addressing information, i.e., the determined mobile directory number of mobile terminal 103. Thus, per step 623, messaging module 113b may transmit the generated message to mobile terminal 103 over one or more of networks 105-111. It is noted that the transmission of the generated message to mobile terminal 103 may be achieved through a service provider associated with messaging platform 115, a third-party messaging service (not shown), or directly transmitted between messaging platform 119 and mobile terminal 103 via, for instance, access point 135.

Figure 7:
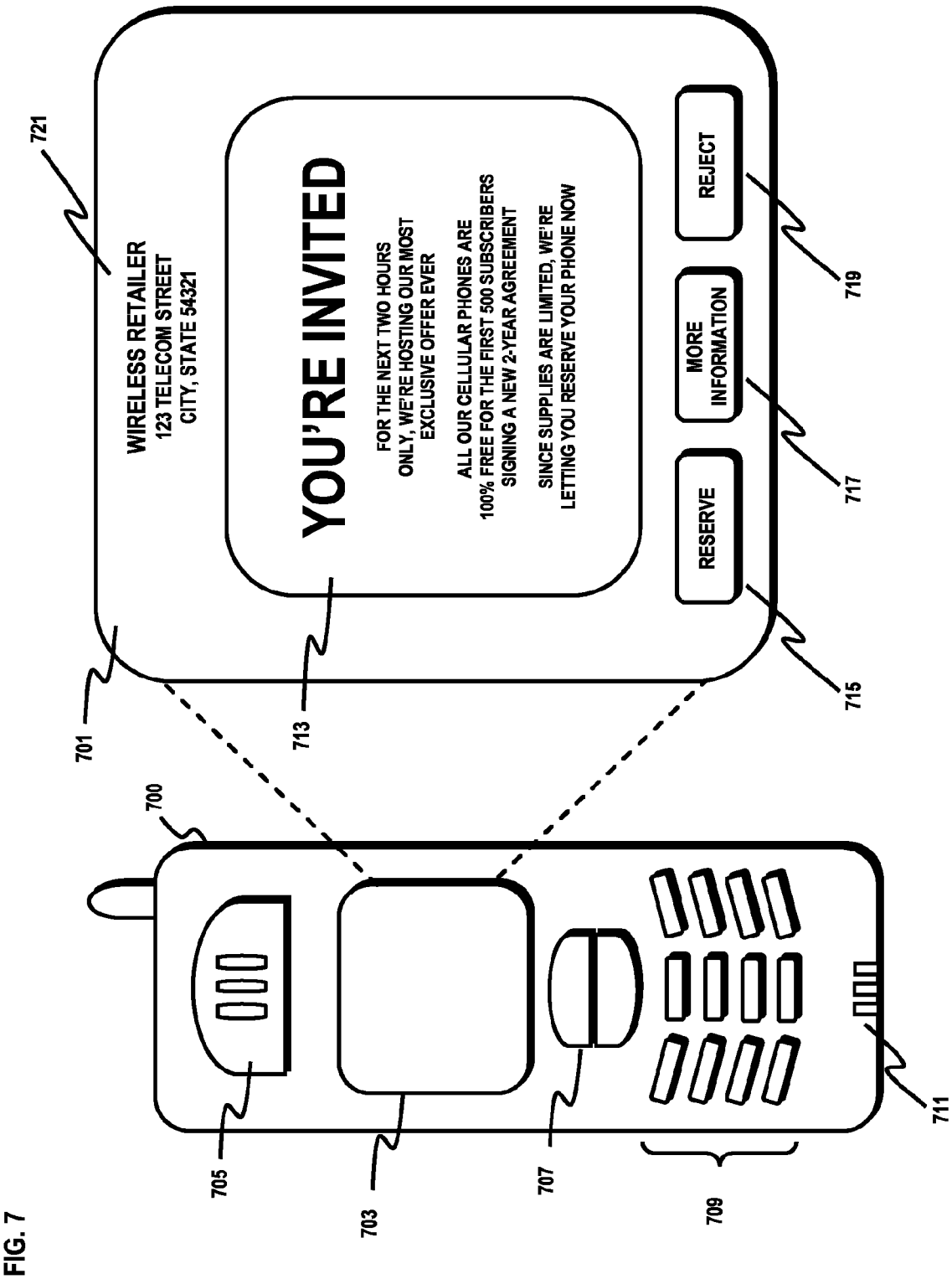
FIG. 7 is a diagram of a mobile terminal for presenting bearer tag identification-based messages, according to an exemplary embodiment.

FIG. 7 is a diagram of a mobile terminal for presenting bearer tag identification-based messages, according to an exemplary embodiment. In this example, users may employ mobile device 700 to receive and interact with one or more messages (e.g., SMS, EMS, MMS, WAP push, etc., messages) from third-parties, such as a third-party associated with customer premise 117. It is assumed that mobile device 700 includes (or is otherwise associated with) a bearer tag, such as bearer tag 101, such that when the bearer tag of mobile device 700 comes within a certain distance (or proximity) of bearer tag reader 133, a message may be transmitted to mobile device 700 over one or more of networks 105-111. For illustrative purposes, mobile device 700 is described with respect to a mobile phone, such as a cellular phone, that is configured to provide GUI 701 to users via display 703, such that a message may be perceived and, in certain instances, interacted with by users. Auditory components of the message may be output via one or more suitable transducers (e.g., speakers) 705. Cursor buttons 707, keypad 709, and microphone 711 enable users to interact with GUI 701 of display 703 and, thereby, with the message. As such, mobile device 700 may also be capable of speech synthesis and voice recognition.

According to one embodiment, GUI 701 may present users with interactive message 713 that provides users with an exclusive cellular phone offer associated with, for example, customer premise 117. It is contemplated; however, that any suitable SMS, EMS, MMS, WAP push, etc., message may be presented by GUI 701. Furthermore, interactive message 713, or portions thereof, may be audibly conveyed to users via transducers 705. Users may interact with interactive message 713 via one or more of control options 715, 717, and 719, which may be presented to users in the form of one or more "soft keys" executable via a touch interface of display 703, cursor buttons 707, keypad 709, and/or microphone 711. For instance, control option 715 may enable users to reserve a cellular phone so as not to lose out on the cellular phone offer presented by interactive message 713. Control option 717 enables users to receive more information about the exclusive offer, such as one or more details governing a new, two-year agreement, how many customers have already responded to the exclusive offer, what cellular phones remain available, etc. As such, control option 719 enables users to reject the offer and clear interactive message 713 from a memory (not shown) of mobile device 700. GUI 701 may also provide users with one or more sections for conveying other information, such as section 721 presenting users with a title (or name) and an address for customer premise 117, however, any other suitable information may be provided by section 721, such as metadata corresponding to customer premise 117, e.g., contact information, description, hours of operation, other product or service offerings, catalogues, menus, product or service prices, and the like.

Although not shown, GUI 701 may also include various other GUI features for experiencing and/or interactive with messages presented by mobile device 700, such as in new or different GUIs, as overlay content within the illustrated GUI, etc. These other GUI features may include navigation trees, an expandable table of contents, or FlashMedia presentations of selectable entries. GUI 701 may also include various input fields, selectable elements (e.g., toggle buttons, check boxes, radio buttons, sliders, list boxes, spinners, drop-down lists, menus, toolbars, ribbons, combo boxes, icons, etc.), output fields (e.g., labels, tooltips, balloon helps status bars, progress bars, infobars, etc.) and windows, as well as any other suitable interface widget for presenting information via or interfacing with GUI 701. In addition, GUI 701 may be employed for the purposes of registering to the managed messaging service of system 100, as well as creating, customizing, and managing one or more user profiles including, for instance, at least one user-defined messaging policy. It is also noted that GUI 701 may enable users to search one or more memories or repositories, such as user profiles repository 131, message content repository 127, etc. As such, GUI 701 may include one or more fields for inputting parameters and/or one or more soft controls corresponding to, for example, an alphanumeric keyboard or other suitable interface for inputting parameters. The controls, input fields, and presentations may also be provided via transducer(s) 705 and microphone 711 acting as an interactive voice response (IVR) interface.

The processes described herein for providing bearer tag identification-based messaging may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
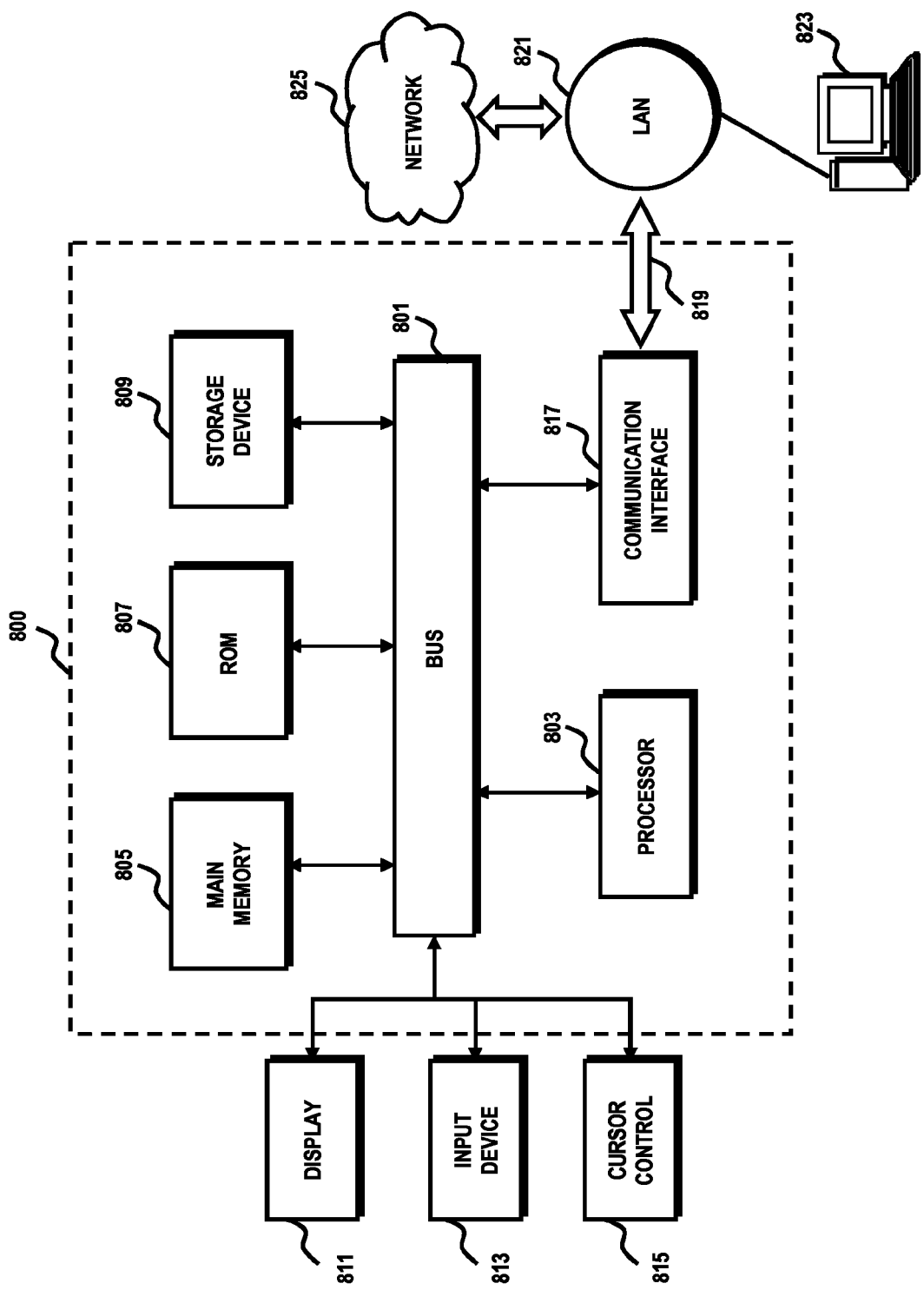
FIG. 8 is a diagram of a computer system that can be used to implement various exemplary embodiments.

FIG. 8 illustrates computing hardware (e.g., computer system) 800 upon which various exemplary embodiments may be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811. In certain implementations, display 811 may provide an additional (or alternative) input device 813, such as an active or passive touch interface, capable of detecting presence and location of a touch or other suitable interaction within at least a portion of display 811. Various forms of touch interfaces may be provided via resistive, surface acoustic wave, capacitive, surface capacitance, projected capacitance, infrared, strain gauge, acoustic pulse recognition, etc., interfaces. Accordingly, interaction with a suitable touch interface may relate to corresponding input information or commands that can be passed to processor 803.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving a request specifying a bearer tag identifier corresponding to a mobile terminal; determining addressing information for the mobile terminal based on the bearer tag identifier; and
   providing an anonymous gateway service to a user of the mobile terminal, wherein the addressing information is used for transmitting a message according to a messaging service to the mobile terminal over a wireless network,
   based on user profile information associated with the user of the mobile terminal, determining whether to transmit the message to the mobile terminal, and
   determining a service provider associated with the mobile terminal as part of the anonymous gateway service to the user of the mobile terminal.

2. A method according to claim 1, further comprising: retrieving content from a networked repository of a service provider based on user profile information associated with the user of the mobile terminal; and generating the message utilizing the content.

3. A method according to claim 2, wherein retrieving the content is further based on scheduling information.

4. A method according to claim 1, wherein the request includes content for generating the message.

5. A method according to claim 1, wherein the bearer tag identifier includes a radio frequency identification value, and the messaging service is either a short message service (SMS) or a multimedia message service (MMS).

6. An apparatus comprising:
   a communication interface configured to receive a request specifying a bearer tag identifier corresponding to a mobile terminal as part of a managed messaging service; and a processor configured to determine addressing information for the mobile terminal based on the bearer tag identifier and to provide an anonymous gateway service to a user of the mobile terminal, wherein the addressing information is used for transmitting a message according to a messaging service to the mobile terminal over a wireless network, and wherein the processor is further configured to, based on user profile information associated with the user of the mobile terminal, determine whether the message is to be transmitted to the mobile terminal.

wherein the processor is further configured to determine a service provider associated with the mobile terminal as part of the anonymous gateway service to the user of the mobile terminal.

7. An apparatus according to claim 6, wherein the processor is further configured to generate the message utilizing content retrieved from a networked repository of a service provider supporting the managed messaging service based on user profile information associated with the user of the mobile terminal.

8. An apparatus according to claim 7, wherein the content is also retrieved based on scheduling information.

9. An apparatus according to claim 6, wherein the request includes content for generating the message.

10. An apparatus according to claim 6, wherein the bearer tag identifier includes a radio frequency identification value, and the messaging service is either a short message service (SMS) or a multimedia message service (MMS).

11. A method comprising:
receiving a bearer tag identifier corresponding to a mobile terminal;
generating a request for transmitting a message to the mobile terminal, the request specifying the bearer tag identifier;
determining addressing information, based on the bearer tag identifier, for transmitting a message according to a messaging service to the mobile terminal,
providing an anonymous gateway service to a user of the mobile terminal, wherein the messaging service includes either a short message service (SMS) or a multimedia message service (MMS), and
based on user profile information associated with the user of the mobile terminal, determining whether to transmit the message to the mobile terminal, and
determining a service provider associated with the mobile terminal as part of the anonymous gateway service to the user of the mobile terminal.

12. A method according to claim 11, further comprising: detecting, at a premise of a third party, a radio frequency identification (RFID) transponder coupled to the mobile terminal; reading the bearer tag identifier from the RFID transponder.

13. A method according to claim 12, wherein the addressing information is determined by either the third party or the service provider associated with the mobile terminal.

14. An apparatus comprising:
a communication interface configured to receive a bearer tag identifier corresponding to a mobile terminal; and
a processor configured to generate a request for transmitting a message to the mobile terminal, the request specifying the bearer tag identifier, wherein the processor is further configured to determine addressing information, based on the bearer tag identifier, for transmitting a message according to a messaging service to the mobile terminal, and to provide an anonymous gateway service to a user of the mobile terminal, the messaging service including either a short message service (SMS) or a multimedia message service (MMS), and
wherein the processor is further configured to, based on user profile information associated with the user of the mobile terminal, determine whether the message is to be transmitted to the mobile terminal, and
determine a service provider associated with the mobile terminal as part of the anonymous gateway service to the user of the mobile terminal.

15. An apparatus according to claim 14, wherein the communication interface is further configured to communicate with a bearer tag reader that is configured to detect, at a premise of a third party, a radio frequency identification (RFID) transponder coupled to the mobile terminal and to read the bearer tag identifier from the RFID transponder.

16. An apparatus according to claim 15, wherein the addressing information is determined by either the third party or the service provider associated with the mobile terminal.

* * * * *